United States Patent [19]
Klais

[11] Patent Number: 6,014,908
[45] Date of Patent: Jan. 18, 2000

[54] RELEASABLE ATTACHMENT FOR SHIFT HANDLE

[75] Inventor: Matthew E. Klais, Waterford, Mich.

[73] Assignee: Chrysler Corporation, Auburn Hills, Mich.

[21] Appl. No.: 09/081,979

[22] Filed: May 20, 1998

[51] Int. Cl.$^7$ .............. B60K 20/00; G05G 1/04; F16B 1/00; F16D 1/00
[52] U.S. Cl. ............. 74/471 R; 74/523; 403/225
[58] Field of Search ............... 74/523, 473.36, 74/471 R, 519, 524; 403/220–228, 305, 306; 464/153, 89; 29/426.1, 897.2

[56] References Cited

U.S. PATENT DOCUMENTS

| | | |
|---|---|---|
| 3,060,559 | 10/1962 | Levenson . |
| 4,027,373 | 6/1977 | Kwast et al. . |
| 4,960,009 | 10/1990 | Schultz et al. ............. 403/224 X |
| 5,189,925 | 3/1993 | Neal et al. ............. 74/473 R |
| 5,213,002 | 5/1993 | Langhof et al. ............. 74/543 X |
| 5,228,361 | 7/1993 | Chazot et al. ............. 74/523 |
| 5,347,881 | 9/1994 | Watson et al. ............. 403/281 X |
| 5,351,382 | 10/1994 | Merrick ............. 29/426.1 X |
| 5,363,721 | 11/1994 | Hsiao ............. 29/426.1 X |
| 5,452,623 | 9/1995 | Knight ............. 74/523 X |
| 5,467,664 | 11/1995 | Wehner ............. 74/523 |
| 5,579,661 | 12/1996 | Yarnell et al. ............. 74/473 R |

*Primary Examiner*—Vinh T. Luong
*Attorney, Agent, or Firm*—Kenneth H. Maclean

[57] ABSTRACT

A manual shift lever connection mechanism for connecting a shift handle to the stub shaft of a transmission. The connection mechanism has a sleeve portion disposed about said stub shaft and an insert member for engaging the stub shaft disposed within said sleeve portion. The insert member further has an engagement mechanism for engaging a disassembly tool.

6 Claims, 3 Drawing Sheets

RELEASABLE ATTACHMENT FOR SHIFT HANDLE

BACKGROUND OF THE INVENTION

The present invention relates to a manual shift lever mechanism for an automobile gear shaft assembly. More particularly, the invention is directed to an improved manual shift lever assembly which can easily be installed and removed from the steel stub shaft of the gear shift assembly.

In general, shift lever mechanisms, are operatively associated with both manual and automatic transmissions for directing the power to the driven wheels of a motor vehicle. The lever mechanism provides the driver with a means to engage/instruct the transmission which gear the transmission should be placed into as well as which direction the vehicle should travel. The connection in a manual transmission will be in almost constant contact with the driver's hand and as such, the mechanism must be securely connected to the shaft and provide damping to isolate vibrations transmitted from the vehicle's transmission through the handle's connection mechanism to the driver.

Most automotive shift lever mechanisms are typically fixedly connected to the stub shaft of the transmission located in the shift tower. Tight production tolerances and vibration isolation require a normal production process which uses a pneumatic press to push the shift lever into place, forming an interference fit.

As can be appreciated, considerable difficulty has been experienced in removing the handle assembly from the stub post. Such disassembly is necessary to replace the shift tower or repair the handle should one of these parts become damaged or worn. Various procedures have been used to force the press fitted handle off the stub shaft, including prying with levers (as seen in FIG. 1) or fixturing in an arbor press. The former is objectionable in that it is uncertain and dangerous; the latter is costly and cumbersome.

SUMMARY OF THE INVENTION

In view of the foregoing, it is an object of the present invention to provide a mechanism for connecting the handle of a gear shift to the stub shaft of a transmission. More particularly, a low cost connecting mechanism is provided which allows easy disengagement of the shift lever from the stub shaft as well as vibration isolation. The shift lever and connecting mechanism contain an insert with a locking member and a mating couple feature. The mating couple feature engages a removal mechanism, for drawing the locking feature from engagement with a locking groove located in the stub shaft.

It is a further object of the current invention to provide an inexpensive connection means which will couple to the current production stub shaft with little or no changes to the existing stub shaft design.

It is still a further object of the invention to provide an inexpensive removal mechanism for engaging with the insert feature of the connection means. More particularly, a removal mechanism is provided which is comprised entirely of a single pair of standard M6 bolts and a pair of accompanying nuts threaded thereon.

DETAILED DESCRIPTION OF THE PREFERRED EMBODIMENTS

The following description of the preferred embodiment is mainly exemplary in nature and is in no way intended to limit the invention or its application or uses.

Figure 1:
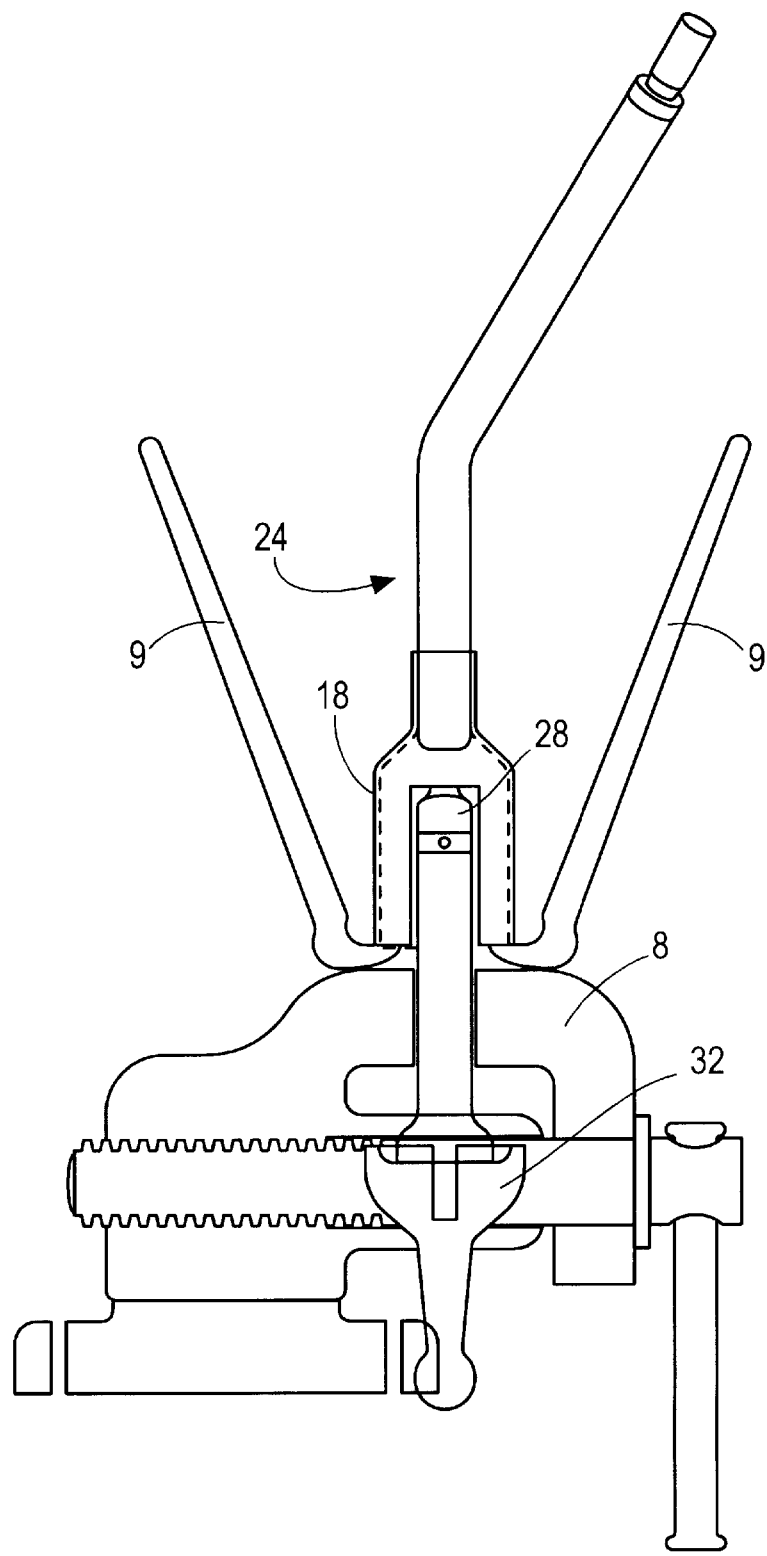
FIG. 1 shows a known removal process of the shift handle from the shift tower.

FIG. 1 shows a known method of removal of a production shift handle from a steel stub shaft 28. A shift tower 32 is locked into a vise 8, and two pry bars 9 are placed under a connection mechanism 18. Force is applied to the pry bars 9 until the shift lever assembly 24 is disengaged from the steel stub shaft 28.

Figure 2:
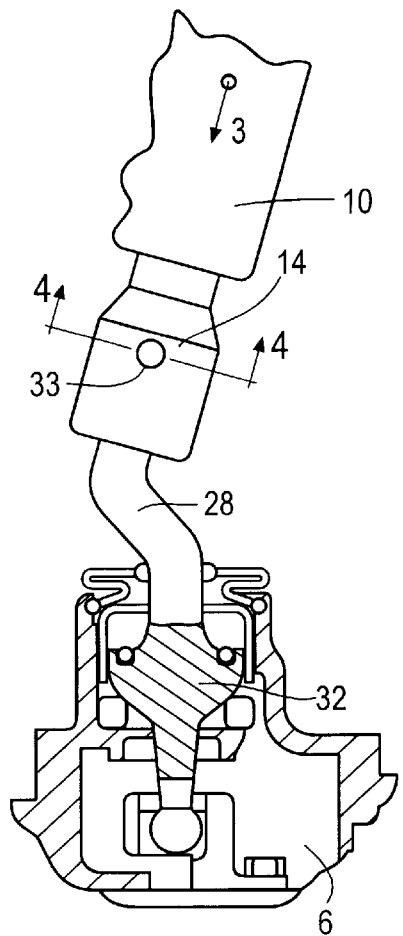
FIG. 2 shows a shift tower with steel stub shaft insert and handle connected to a transmission.
Figure 3:
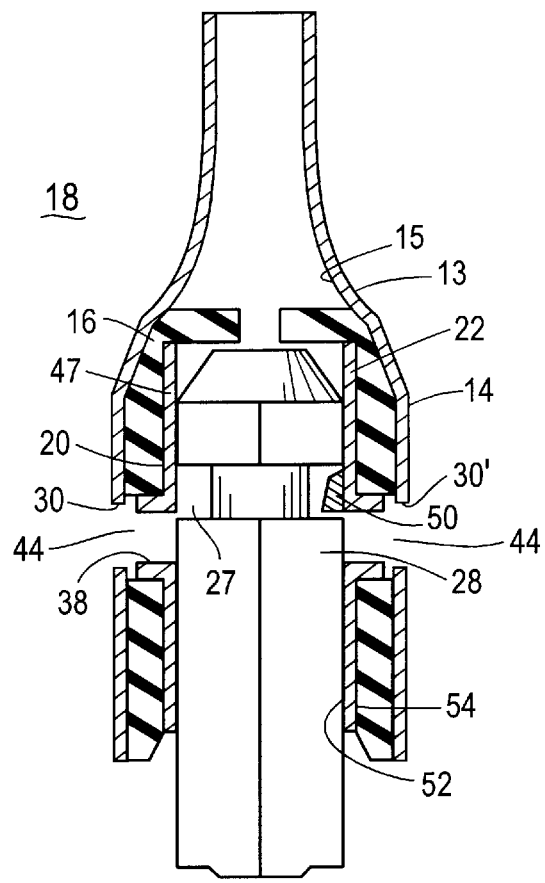
FIG. 3 is a cut away view of the handle with the connecting mechanism of the current invention as seen through section line 3 of FIG. 2.

FIG. 2 shows a shift tower 32 with steel stub shaft 28 and shift handle 10, with a steel adapter 14. Steel adapter 14 has a hole 30 which is used to access an engagement member 38 (FIG. 3). The shift handle 10 is further shown functionally coupled to a manual transmission 6 through the shift tower 32.

Figure 4:
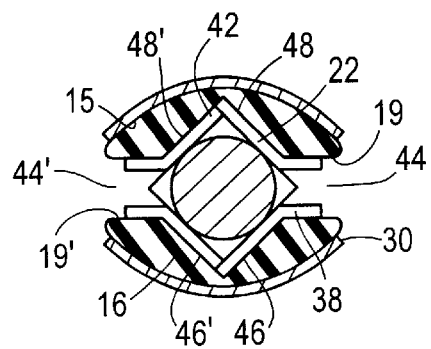
FIG. 4 is a cutaway view through section line 4 of FIG. 2 of the handle with connecting mechanism of the current invention.
Figure 6:
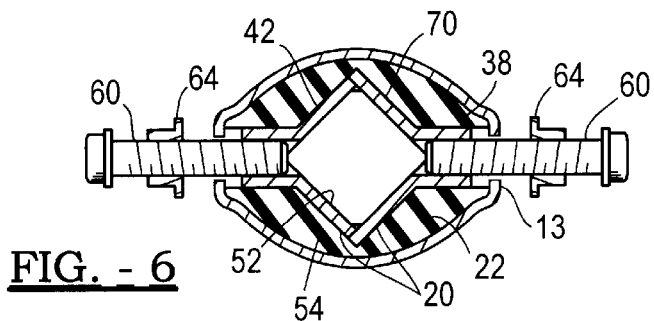
FIG. 6 is an end view of the handle with disconnecting mechanism of the current invention in an unactuated state.
Figure 7:
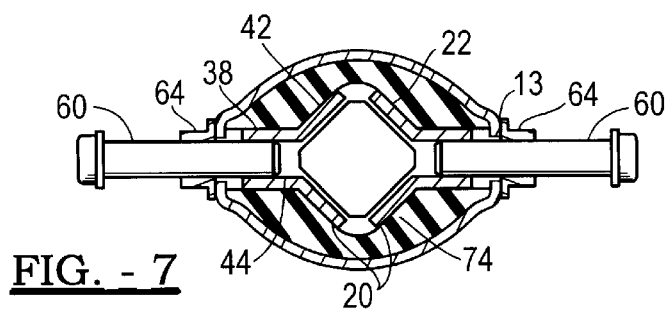
FIG. 7 is an end view of the handle with disconnecting mechanism of the current invention in an actuated state.

As best seen in FIGS. 3, 6, and 7, connection mechanism 18 of the invention is comprised of a steel adapter 14 having an inner surface 15 and outer surface 13 and a pair of holes 30, 30'. The steel adapter 14 is journally coupled about the steel stub shaft 28. The connection mechanism 18, further has a locking portion 20 which is movable from a first locked position 70 (FIG. 6) to a second unlocked position 74 (FIG. 7), is comprised of a pair of steel inserts 22, 42 each having an inner surface 52 and outer surface 54. As can be seen in FIG. 4, the preferred inserts 22, 42 each have two members (46, 48) and (46', 48') respectfully, for enclosing the stub shaft 28, which meet at an interface 47 (FIG. 3). At the interface 47 of the two members 46,48 is an extended portion 38 which has a threaded hole 44 therethrough. The extending portion is disposed at a sufficient distance from the inner surface 15 of the adapter member 14 to allow movement of the insert 22 from its locked position 70 to unlocked position 74. The threaded hole 44 is in alignment with the pair of holes 30, 30' in the adapter sleeve 14. The locking portion 20 further has an elastomeric material 16 disposed between the outer surface 54 of the insert 22 and the inner surface 15 of the adapter sleeve 14. The elastomeric material 16 further has a pair of holes 19, 19' in alignment with the holes 30, 30' in the adapter sleeve 14 and steel insert 22.

An optional locking member 50 to locking portion 20 is depicted in FIG. 3. A locking member 50 is disposed on the inner surface 52 of the insert member 22 and is arranged to engage a groove 27 located on the stub shaft 28.

Figure 5:
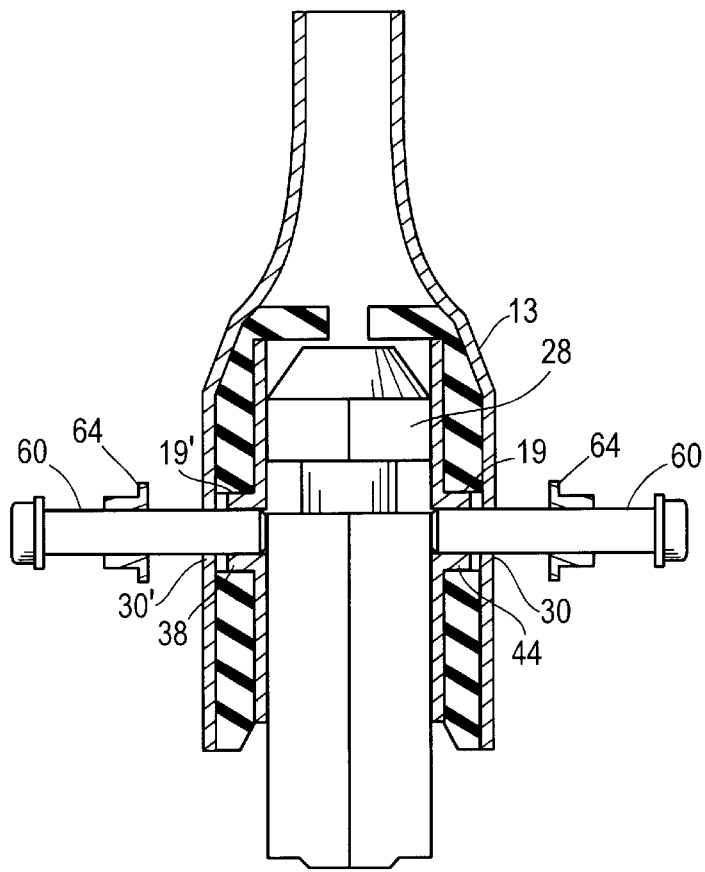
FIG. 5 is an side view of the handle with disconnecting mechanism of the current invention.

The removal process can be best seen in FIGS. 5, 6, and 7. Threaded M6 bolts 60 with corresponding nuts 64 are threaded through holes 30, 30' of adapter 14 and holes 19, 19' of the elastomeric material 16 into the threaded holes 44, 44' of the extending members 38 of the locking portion 20.

Each M6 bolt 60 is rotated into holes 44, 44' until it bottoms out on the stub shaft 28. The corresponding nut 64 is then rotated until it reaches the outer surface 13 of the adapter 14. The nut 64 is then tightened, pulling the locking portion 20 and optionally the corresponding lock member 50 (FIG. 3) away from its initial locked position 70. The optional corresponding lock member 50 is moved out of the stub shaft groove 27 of stub shaft 28 and closer to the adapter member 14 by compressing the elastomeric material 16 and moving the connecting mechanism 20 into its corresponding second unlocked position 74. The handle 10 is disengaged from the stub shaft 38 and can thus be removed by extracting the adapter member 14 from the stub shaft 28.

Those skilled in the art can appreciate from this description that the broad teachings of the present invention can be implemented in a variety of forms. For example, the engagement member on the insert can be of the form of a hook, barb or other member allowing the engagement of the disconnecting member. Similarly, the disengaging member need not take the form of a standard bolt but may be replaced by any member which will function to move the insert member from it's initial locked to unlocked position. Therefore, the true scope of the invention, and other modifications will become apparent to the skilled practitioner upon a study of the drawings, specification, and the following claims.

What is claimed is:

1. A manual shift lever connection mechanism for connecting a shift handle to a stub shaft of a transmission comprising:

a disassembly tool;

a sleeve portion having an interior surface, adapted for disposition about a stub shaft;

an insert member disposed within said sleeve portion, having a threaded hole for engaging the disassembly tool, and a locking member adapted for engaging a stub shaft.

2. The manual shift lever connection mechanism of claim 1 further comprising:

an elastomeric material disposed between the insert member and the sleeve portion interior surface; and the sleeve portion defining a first opening being functionally aligned with the threaded hole.

3. The manual shift lever connection mechanism of claim 1 wherein said insert member further comprises a tubular portion defining the threaded hole therethrough.

4. The manual shift lever connection mechanism of claim 1 wherein the insert member has a first locked and second unlocked position.

5. The manual shift lever connection mechanism of claim 1 wherein said insert member has an interior surface which is the locking member for engaging the stub shaft.

6. The manual shift lever connection mechanism of claim 1 wherein said insert member is formed of a first and second member;

the first and second members having interior surfaces for engaging the stub shaft.

* * * * *